US011196295B2

(12) United States Patent
Zhong et al.

(10) Patent No.: US 11,196,295 B2
(45) Date of Patent: Dec. 7, 2021

(54) WIRELESS POWER SUPPLY DEVICE AND ELECTRICAL APPARATUS HAVING THE SAME

(71) Applicant: Tyco Electronics (Shanghai) Co. Ltd., Shanghai (CN)

(72) Inventors: Yuan Zhong, Shanghai (CN); Chenxi Wang, Shanghai (CN); Yulin Feng, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 24 days.

(21) Appl. No.: 16/727,501

(22) Filed: Dec. 26, 2019

(65) Prior Publication Data
US 2020/0212712 A1    Jul. 2, 2020

(30) Foreign Application Priority Data

Dec. 27, 2018  (CN) .......................... 201822229973.9

(51) Int. Cl.
*H02J 50/10*    (2016.01)
*H01F 38/14*    (2006.01)
(Continued)

(52) U.S. Cl.
CPC .......... *H02J 50/10* (2016.02); *A47L 15/4274* (2013.01); *H01F 27/24* (2013.01); *H01F 38/14* (2013.01);
(Continued)

(58) Field of Classification Search
CPC . H02J 50/10; H02J 50/70; H02J 7/025; H01F 38/14; H01F 27/24; H01F 27/38;
(Continued)

(56) References Cited

U.S. PATENT DOCUMENTS 5,741,316 A     4/1998  Chen et al.
2003/0230956 A1*  12/2003  Flowers .............. A47L 15/4261
                                                    312/228

(Continued)

FOREIGN PATENT DOCUMENTS

JP        H 104639 A      1/1998
JP       2005-137173 A    5/2005
(Continued)

OTHER PUBLICATIONS

Abstract of JP2005137173, dated May 26, 2005, 1 page.
Abstract of JPH104639, dated Jan. 6, 1998, 1 page.

*Primary Examiner* — John W Poos
*Assistant Examiner* — Alex W Lam
(74) *Attorney, Agent, or Firm* — Barley Snyder (57) ABSTRACT

A wireless power supply device includes a first housing, a transmitting coil assembly mounted in the first housing, a second housing, and a receiving coil assembly mounted in the second housing and electromagnetically coupled with the transmitting coil assembly. The first housing has a U-shaped outer contour and includes a first portion, a second portion, and a third portion. The second portion and the third portion extend perpendicularly to the first portion from opposite ends of the first portion. The second portion and the third portion form a recess between the second portion and the third portion. The second housing extends into the recess.

22 Claims, 8 Drawing Sheets (51) Int. Cl.
*H01F 27/24* (2006.01)
*H05B 6/70* (2006.01)
*A47L 15/42* (2006.01)
*A47L 15/00* (2006.01)

(52) U.S. Cl.
CPC ............ *H05B 6/70* (2013.01); *A47L 15/0086* (2013.01); *A47L 15/0089* (2013.01)

(58) Field of Classification Search
CPC ...... H01F 27/02; H01F 27/28; H01F 27/2895; H01F 27/30; H01F 41/02; H01F 41/0206; H01F 41/06; H01F 2003/005; H05B 6/70; H05B 6/6414; H05B 6/6426; A47L 15/4274; A47L 15/0089; A47L 15/0086; A47L 15/006; A47L 15/4293; H04B 5/00; H04B 5/0037; H04B 5/0093
See application file for complete search history.

(56) References Cited

U.S. PATENT DOCUMENTS

2017/0018947 A1\* 1/2017 Chien .................... H02J 50/10
2018/0248587 A1   8/2018 Wang et al.

FOREIGN PATENT DOCUMENTS

JP          2014-17921 A     1/2014
KR     10-2012-0136676       12/2012
WO         2008043264 A1     4/2008

\* cited by examiner

WIRELESS POWER SUPPLY DEVICE AND ELECTRICAL APPARATUS HAVING THE SAME

CROSS-REFERENCE TO RELATED APPLICATION

This application claims the benefit of the filing date under 35 U.S.C. § 119(a)-(d) of Chinese Patent Application No. 201822229973.9, filed on Dec. 27, 2018.

FIELD OF THE INVENTION

The present invention relates to a power supply device and, more particularly, to a wireless power supply device.

BACKGROUND

In home appliances, a mainframe and a cover are usually two separate components. It is necessary to transmit the current from the mainframe to the cover because functional components, such as a display and a controller, are primarily integrated on the cover.

In existing power transmission technology, the transmission is realized by electric wires connected to the cover from the mainframe, resulting in complication in the process of assembly and disassembly of the products. In addition, during the opening and closing of the cover, the electric wires also reciprocate along with the cover, which causes fatigue and failure of the electric wires, reducing the reliability of power transmission.

SUMMARY

A wireless power supply device includes a first housing, a transmitting coil assembly mounted in the first housing, a second housing, and a receiving coil assembly mounted in the second housing and electromagnetically coupled with the transmitting coil assembly. The first housing has a U-shaped outer contour and includes a first portion, a second portion, and a third portion. The second portion and the third portion extend perpendicularly to the first portion from opposite ends of the first portion. The second portion and the third portion form a recess between the second portion and the third portion. The second housing extends into the recess.

BRIEF DESCRIPTION OF THE DRAWINGS

The invention will now be described by way of example with reference to the accompanying Figures, of which.

DETAILED DESCRIPTION OF THE EMBODIMENT(S)

The present disclosure is further described in detail by the following embodiments with reference to the accompanying drawings. In the specification, the same or similar reference numerals denote the same or similar components. The following description of the embodiments of the present disclosure with reference to the accompanying drawings is intended to explain the general inventive concept of the present disclosure and should not be construed as a limitation of the present disclosure.

In addition, in the following detailed description, for purposes of explanation, numerous specific details are set forth in order to provide a thorough understanding of the embodiments of the present disclosure. However, it may be evident, that one or more embodiments may be practiced without these specific details. In other instances, well-known structures and devices are shown in schematic form in order to simplify the drawing.

Figure 1:
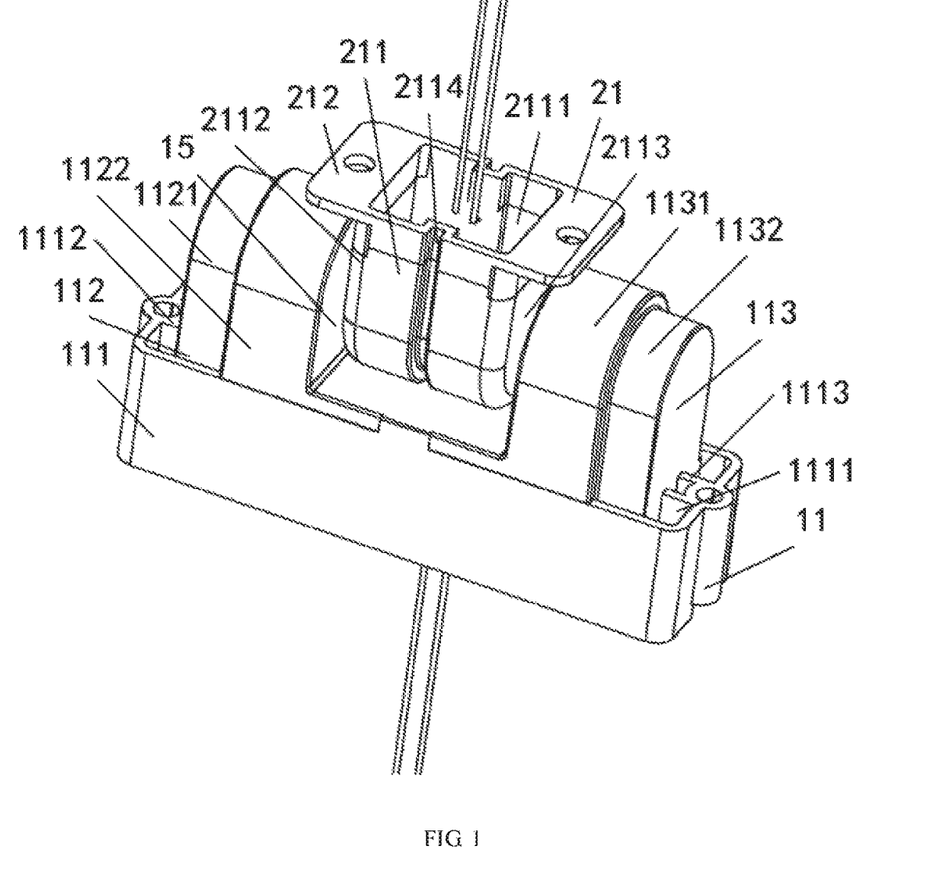
FIG. 1 is a perspective view of a wireless power supply device according to an embodiment.
Figure 2:
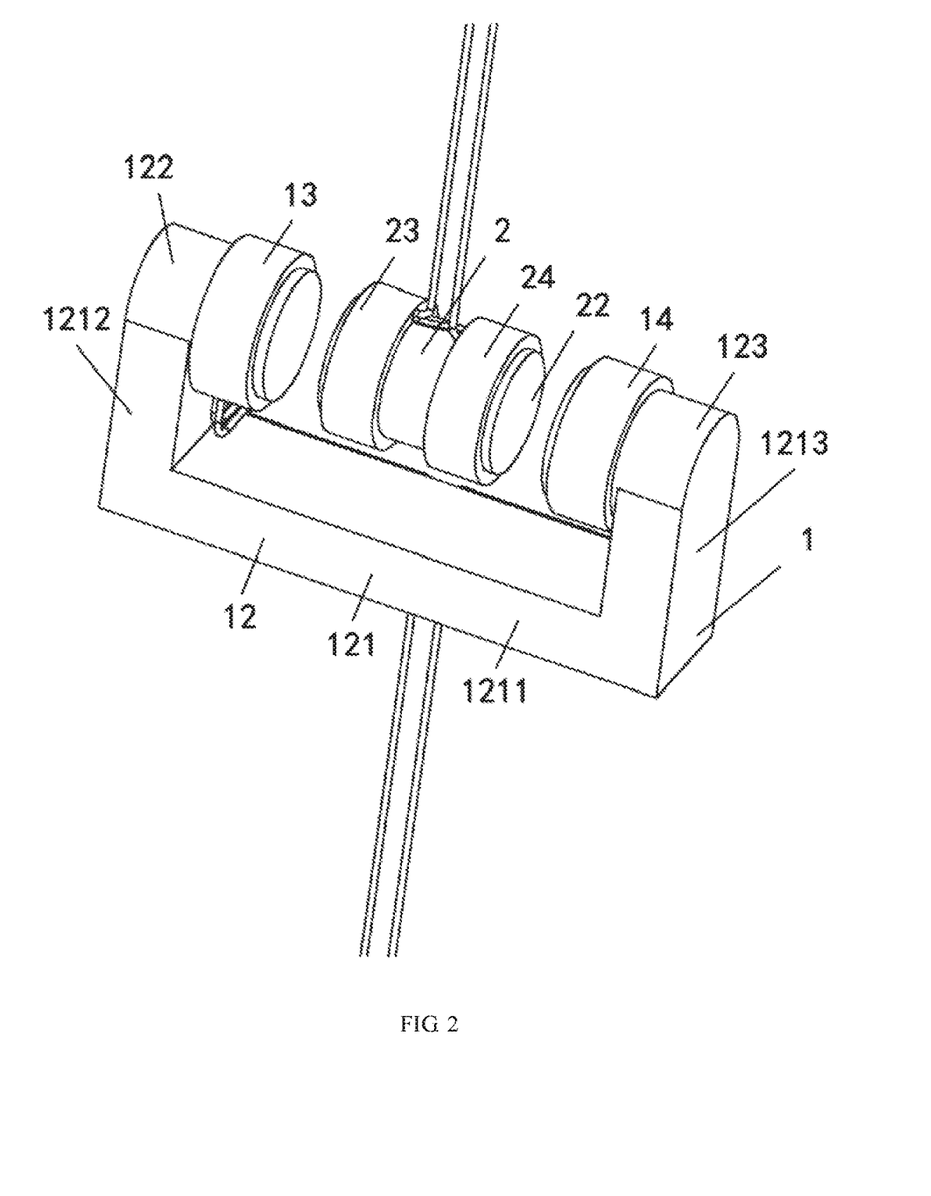
FIG. 2 is a perspective view of a transmitting coil assembly and a receiving coil assembly of the wireless power supply device.

As shown in FIGS. 1 and 2, a wireless power supply device according to an embodiment comprises a first housing 11, a second housing 21, a transmitting coil assembly 1 and a receiving coil assembly 2. The transmitting coil assembly 1 is mounted in the first housing 11 and the receiving coil assembly 2 is mounted in the second housing 21. The transmitting coil assembly 1 in the first housing 11 is electromagnetically coupled with the receiving coil assembly 2 in the second housing 21. The receiving coil assembly 2 is adapted to be electromagnetically coupled with the transmitting coil assembly 1 in a non-contact manner in order to supply power to a power consumption product, such as an electronic product.

As shown in FIG. 1, the first housing 11 has a substantially U-shape outer contour and includes a first portion 111, and a second portion 112 and a third portion 113 extending perpendicularly to the first portion 111 from opposite ends of the first portion 111, so as to form a recess 15 between the second portion 112 and the third portion 113. The second housing 21 extends into the recess 15. In an embodiment, the recess 15 is a U-shaped groove and runs through the first housing 11 in a width direction of the first housing 11. The recess 15, in other embodiments, may be a groove of other shapes, and the second housing 21 may have corresponding convex shapes that may extend into the recess 15.

The transmitting coil assembly 1, as shown in FIG. 2, includes a first magnetic core 12 with a main body portion 121 mounted in the first portion 111, the second portion 112, and the third portion 113 of the first housing 11, a first winding portion 122 mounted in the second portion 112, and a second winding portion 123 mounted in the third portion 113 of the first housing 11.

The transmitting coil assembly 1, as shown in FIG. 2, includes a first transmitting coil winding 13 wound around the first winding portion 122 and a second transmitting coil winding 14 wound around the second winding portion 123. The first transmitting coil winding 13 and the second transmitting coil winding 14 are configured to be electrically connected to each other. The first transmitting coil winding 13 and the second transmitting coil winding 14 are electrically connected in series with each other and the flow directions of the current in the first transmitting coil winding 13 and the second transmitting coil winding 14 are the same.

In an embodiment, the first transmitting coil winding 13 and the second transmitting coil winding 14 may be formed by a single wound wire (e.g., an enameled wire). The first transmitting coil winding 13 and the second transmitting coil winding 14, in another embodiment, may be formed by two separate wound wires and are electrically connected in series by one wire. The winding directions of the first transmitting coil winding 13 and the second transmitting coil winding 14 may be the same or different, as long as the flowing directions of the current in the first transmitting coil winding 13 and the second transmitting coil winding 14 are the same.

As shown in FIG. 2, the main body portion 121 of the first magnetic core 12 is substantially U-shaped, and has a plate-shaped bottom portion 1211, and a first plate-shaped side portion 1212 and a second plate-shaped side portion 1213 located at the opposite ends of the plate-shaped bottom portion 1211. The first and second plate-shaped side portions 1212 and 1213 are parallel to each other and are perpendicular to the plate-shaped bottom portion 1211. The first winding portion 122 is provided at an end of the first plate-shaped side portion 1212 distal to the plate-shaped bottom portion 1211 and extends perpendicular to the first plate-shaped side portion 1212, and the second winding portion 123 is provided at an end of the second plate-shaped side portion 1213 distal to the plate-shaped bottom portion 1211 and extends perpendicular to the second plate-shaped side portion 1213. The plate-shaped bottom portion 1211, the first plate-shaped side portion 1212, and the second plate-shaped side portion 1213 of the main body portion 121 have cross-sectional shapes identical to one another; the cross-sectional shapes are all rectangular. The first winding portion 122 and the second winding portion 123 extend towards each other in the lengthwise direction parallel to the plate-shaped bottom portion 1211. An end surface of the first winding portion 122 distal to the second winding portion 123 is coplanar with an end surface of the first plate-shaped side portion 1212 distal to the second plate-shaped side portion 1213, and an end surface of the second winding portion 123 distal to the first winding portion 122 is coplanar with an end surface of the second plate-shaped side portion 1213 distal to the first plate-shaped side portion 1212.

As shown in FIG. 2, the first winding portion 122 and the second winding portion 123 are both cylindrical, the first winding portion 122 and the second winding portion 123 are coaxial, and the axes of the first winding portion 122 and the second winding portion 123 are both perpendicular to the first plate-shaped side portion 1212 and the second plate-shaped side portion 1213. The diameter and axial length of the first winding portion 122 are equal to that of the second winding portion 123. The first transmitting coil winding 13 is wound around a portion of the first winding portion 122 protruding from the first plate-shaped side portion 1212 to form a cylindrical shape, and the axial length of the first transmitting coil winding 13 is less than that of the portion of the first winding portion 122 protruding from the first plate-shaped side portion 1212. The second transmitting coil winding 14 is wound around a portion of the second winding portion 123 protruding from the second plate-shaped side portion 1213 to form a cylindrical shape, and the axial length of the second transmitting coil winding 14 is less than that of the portion of the second winding portion 123 protruding from the second plate-shaped side portion 1213. The outer diameter and axial length of the first transmitting coil winding 13 are equal to that of the second transmitting coil winding 14.

As shown in FIG. 2, the receiving coil assembly 2 includes a second magnetic core 22, a first receiving coil winding 23, and a second receiving coil winding 24 mounted in the second housing 21. The first receiving coil winding 23 and the second receiving coil winding 24 are wound around the opposite ends of the second magnetic core 22, respectively, so that the first receiving coil winding 23 and the second receiving coil winding 24 are electrically connected to each other. The second magnetic core 22 has a cylindrical shape. The first receiving coil winding 23 and the second receiving coil winding 24 are electrically connected in series with each other and the flow directions of the current in the first receiving coil winding 23 and the second receiving coil winding 24 are the same. The outer diameter and the axial length of the first receiving coil winding 23 are equal to that of the second receiving coil winding 24. Similarly, the first receiving coil winding 23 and the second receiving coil winding 24 may be formed by a single wound wire (e.g., an enamel wire), or may be formed by two separate wound wires and are electrically connected in series by one wire. The winding directions of the first receiving coil winding 23 and the second receiving coil winding 24 may be the same or different, as long as the flowing directions of the current in the first receiving coil winding 23 and the second receiving coil winding 24 are the same.

As shown in FIG. 1, the first portion 111 is substantially cuboid-shaped, and the second portion 112, and the third portion 113 are both arch-shaped. The first portion 111, the second portion 112, and the third portion 113 may render a better adaptation to the shape of the first magnetic core 12 received therein. Wherein the main body portion 121 is accommodated in the first portion 111, the second portion 112, and the third portion 113, the first winding portion 122 and the first transmitting coil winding 13 are accommodated in the second portion 112, and the second winding portion 123 and the second transmitting coil winding 14 are accommodated in the third portion 113.

As shown in FIG. 1, the second portion 112 has a first arch portion 1121 and a second arch portion 1122. The third portion 113 has a third arch portion 1131 and a fourth arch portion 1132. The first arch portion 1121, the second arch portion 1122, the third arch portion 1131, and the fourth arch portion 1132 are sequentially provided at a same side of the first portion 111. The first arch portion 1121 and the fourth arch portion 1132 are symmetrically provided, and the second arch portion 1122 and the third arch portion 1131 are symmetrically provided. The radians of the first arch portion 1121, the second arch portion 1122, the third arch portion 1131, and the fourth arch portion 1132 are all the same. The first arch portion 1121 is used for accommodating a portion of the first winding portion 122 above the first plate-shaped side portion 1212, and the radius of the first arch portion 1121 is larger than that of the first winding portion 122. The second arch portion 1122 is used for accommodating the first transmitting coil winding 13, and the radius of the second arch portion 1122 is larger than that of the first transmitting coil winding 13. The third arch portion 1131 is used for accommodating the second transmitting coil winding 14, and the radius of the third arch portion 1131 is larger than that of the second transmitting coil winding 14. The fourth arch portion 1132 is used for accommodating a portion of the second winding portion 123 above the second plate-shaped side portion 1213, and the radius of the fourth arch portion 1132 is larger than that of the second winding portion 123.

As shown in FIG. 1, the height of the second arch portion 1122 is larger than that of the first arch portion 1121, and the height of the third arch portion 1131 is larger than that of the fourth arch portion 1132. The first arch portion 1121 and the fourth arch portion 1132 have the same length, width and height, and the second arch portion 1122 and the third arch portion 1131 have the same length, width and height.

An end surface of the first portion 111 distal to the second portion 112 and the third portion 113 serves as a mounting surface of the first housing 11. A length of the first portion 111 is larger than the distance between an end surface of the second portion 112 distal to the third portion 113 and an end surface of the third portion 113 distal to the second portion 112 such that the first housing 11 have a sufficiently large mounting surface to ensure the mounting reliability of the first housing 11. The width of the second portion 112 is equal to that of the third portion 113, and may be equal to that of the first portion 111. In order to reduce the difficulty of the manufacturing process and improve the efficiency of the installation, the second portion 112 and the third portion 113 are detachably coupled to the first portion 111 to form a substantially enclosed receiving chamber. The second portion 112 and the third portion 113 may be detachably coupled with the first portion 111 by snap-fit, screws, or other forms of detachable coupling known to those with ordinary skill in the art.

As shown in FIG. 1, a side of the first portion 111 facing the second portion 112 and the third portion 113 has a mounting hole 1111 adapted to mount the second portion 112 and the third portion 113 therein. A length of the mounting hole 1111 is larger than the total length of the second and third portions 112 and 113. The second portion 112 and the third portion 113 are partially inserted into the mounting hole 1111 to be detachably coupled to the first portion 111. The first portion 111 may be a cavity structure with an opening at one end, and the mounting hole 1111 is the opening.

The second portion 112 and the third portion 113 are mounted at a middle position of the mounting hole 1111 in a width direction, as shown in FIG. 1. The second portion 112 and the third portion 113 do not abut against both left and right sides (i.e. two sides in the length direction) of the mounting hole 1111, a first gap is formed between the second portion 112 and the left edge (i.e. a first edge in the length direction) of the first portion 111, and a second gap is formed between the third portion 113 and the right edge (i.e. a second edge in the length direction) of the first portion 111. A length of the first gap is equal to that of the second gap. A first abutting plate 1112 that protrudes from the first portion 111 into the first gap and extends until it abuts against the second portion 112 in the first gap is disposed on the left edge of the first portion 111, and a second abutting plate 1113 that protrudes from the first portion 111 into the second gap and extends until it abuts against the third portion 113 in the second gap is disposed on the right edge of the first portion 111.

Each of the first abutting plate 1112 and the second abutting plate 1113 have two plates, and the two respective plates are parallel to each other. A first through hole is disposed at the intersection of the two first abutting plates 1112 and the left edge of the first portion 111, and a second through hole is disposed at the intersection of the two second abutting plates 1113 and the right edge of the first portion 111. The first through hole and the second through hole extend through the first portion 111 in the height direction of the first portion 111. The first and second through holes along with respective fasteners assemble the first housing 11 to an apparatus requiring a wireless power supply device. The first and second abutting plates 1112 and 1113 not only function to support the second and third portions 112 and 113, but also enhance the structural strength and rigidity of the first portion 111.

As shown in FIG. 1, the second housing 21 has a fourth portion 211 configured to be a cavity structure with an opening 2111, and a fifth portion 212 configured to be a plate-shaped structure extending outwards from an edge of the opening 2111. The fourth portion 211 is used for accommodating the second magnetic core 22, the first receiving coil winding 23, and the second receiving coil winding 24, and the length of the fourth portion 211 is less than that of the recess 15. Such a configuration of the second housing 21 enables the second magnetic core 22 to be placed between the second arch portion 1122 and the third arch portion 1131 so as to be electromagnetically coupled with the first transmitting coil winding 13 and the second transmitting coil winding 14 received in the second arch portion 1122 and the third arch portion 1131. The receiving coil assembly 2 may be placed in the second housing 21 through the opening 2111. The opening 2111, in the shown embodiment, is two rectangular holes communicating with each other, the length of the opening 2111 is larger than that of the receiving coil assembly 2, and the width of the opening 2111 is larger than that of the receiving coil assembly 2. The fifth portion 212 has third through holes at different sides of the opening 2111, through which the fifth portion 212 of the second housing 21 can be connected to an apparatus requiring a wireless power supply.

As shown in FIG. 1, the fourth portion 211 has a fifth arch portion 2112 and a sixth arch portion 2113. The fifth arch portion 2112 and the sixth arch portion 2113 are symmetrically disposed. A connection groove 2114 is provided at the junction of the two arch portions 2112 and 2113. The connection grooves 2114 are formed to be protrusions extending oppositely in the opening 2111 and located between the two rectangular holes of the opening 2111, and the distance between the two opposing protrusions is larger than the outer diameter of the second magnetic core 22. The connection groove 2114 may serve to reinforce the structural strength of the second housing 21, and also prevent the second magnetic core 22, the first receiving coil winding 23, and the second receiving coil winding 24 from shifting in the length direction in the second housing 21.

In an embodiment, an electrical apparatus 3, as shown in FIGS. 3-11, comprises a mainframe 31, a cover 32 pivotably mounted on the mainframe 31, and a wireless power supply device according to any one of the above embodiments. The first housing 11 is mounted on one of the mainframe 31 and the cover 32, and the second housing 21 is mounted on the other of the mainframe 31 and the cover 32. The electrical apparatus 3 is one of a sink dishwasher, a table dishwasher, a cabinet dishwasher, an integrated kitchen dishwasher or a microwave oven. In an embodiment, the first housing 11 is mounted on the mainframe 31, and the second housing 21 is mounted on the cover 32. In another embodiment, the first housing 11 is mounted on the cover 32, and the second housing 21 is mounted on the mainframe 31.

Figure 3:
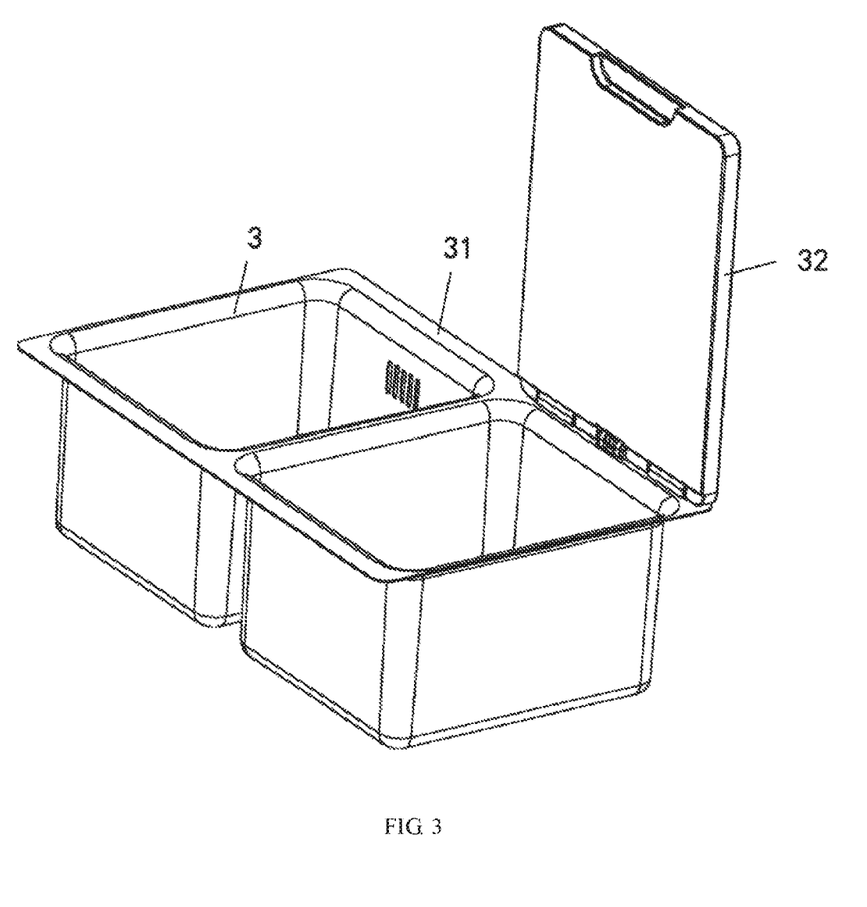
FIG. 3 is a perspective view of a sink dishwasher according to an embodiment.
Figure 4:
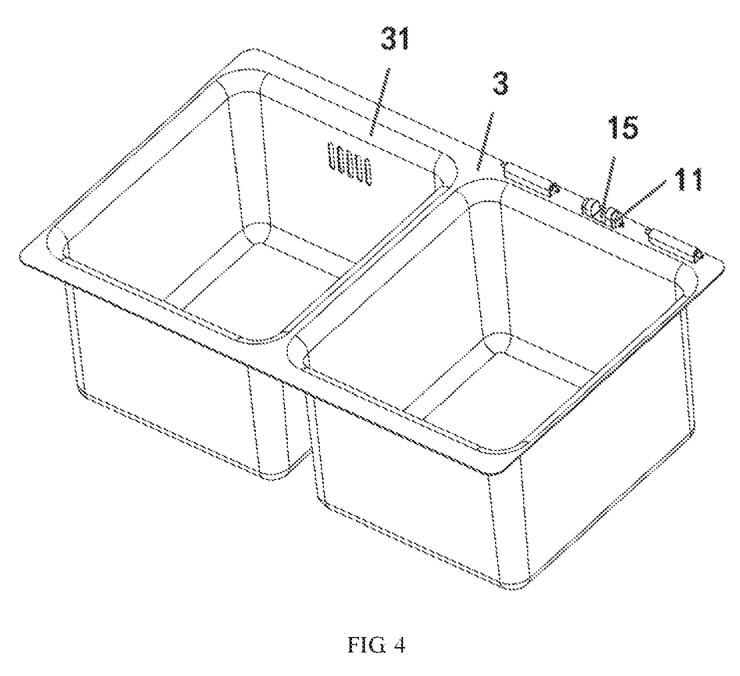
FIG. 4 is a perspective view of a mainframe of the sink dishwasher of FIG. 3.
Figure 5:
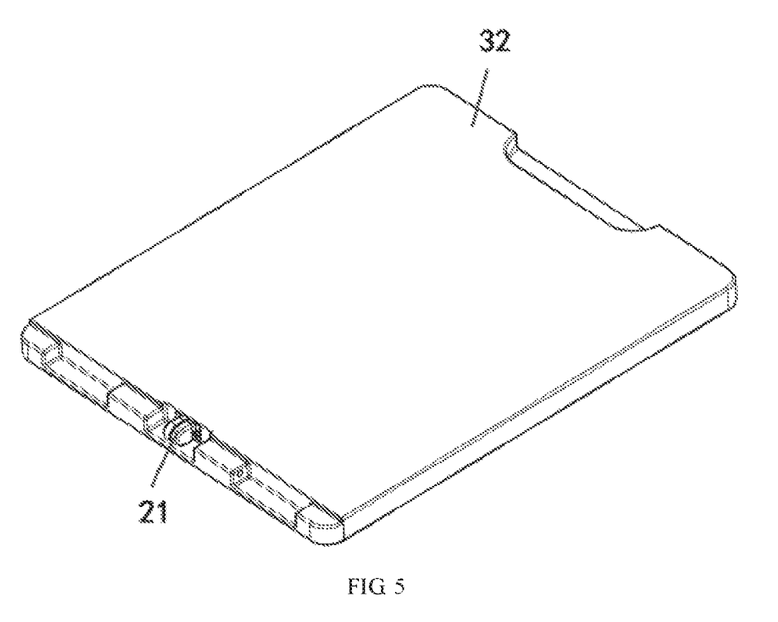
FIG. 5 is a perspective view of a cover of the sink dishwasher of FIG. 3.

In the embodiment shown in FIGS. 3-5, the electrical apparatus 3 is a sink dishwasher, the first housing 11 is mounted on the mainframe 31 of the sink dishwasher, and the second housing 21 is mounted on the cover 32 of the sink dishwasher. The first housing 11 and the second housing 21 are both mounted at positions close to the rotation axis of the cover 32. As shown in FIG. 4, in an embodiment, the first housing 11 is fixed onto the mainframe 31 of the sink dishwasher by screws, snap-fit, adhesives and the like, and the cable of the transmitting coil assembly 1 in the first housing 11 is connected to the main control system of the sink dishwasher. As shown in FIG. 5, in an embodiment, the second housing 21 is fixed on the cover 32 of the sink dishwasher by screws, snap-fit, adhesives and the like. The cable of the receiving coil assembly 2 in the second housing 21 is connected to the electric appliance of the sink dishwasher such as a display screen and an operation switch or a button. The axes of the first magnetic core 12 in the first housing 11 and the second magnetic core 22 in the second housing 21 are respectively coincident with the rotation axis of the cover 32 of the sink dishwasher, and the receiving coil assembly 2 in the second housing 21 is always accommodated in the recess 15 of the first housing 11. During the opening or closing of the cover 32, the first housing 11 and the transmitting coil assembly 1 received in the first housing 11 are kept stationary, the second housing 21 and the receiving coil assembly 2 received in the second housing 21 are rotated about the rotation axis of the cover 32, the receiving coil assembly 2 in the second housing 21 is always accommodated in the recess 15 of the first housing 11 during the entire opening or closing, and the internal current is wirelessly transmitted from the transmitting coil assembly 1 to the receiving coil assembly 2, thereby supplying the current to the electric appliance on the cover 32 of the sink dishwasher.

Figure 6:
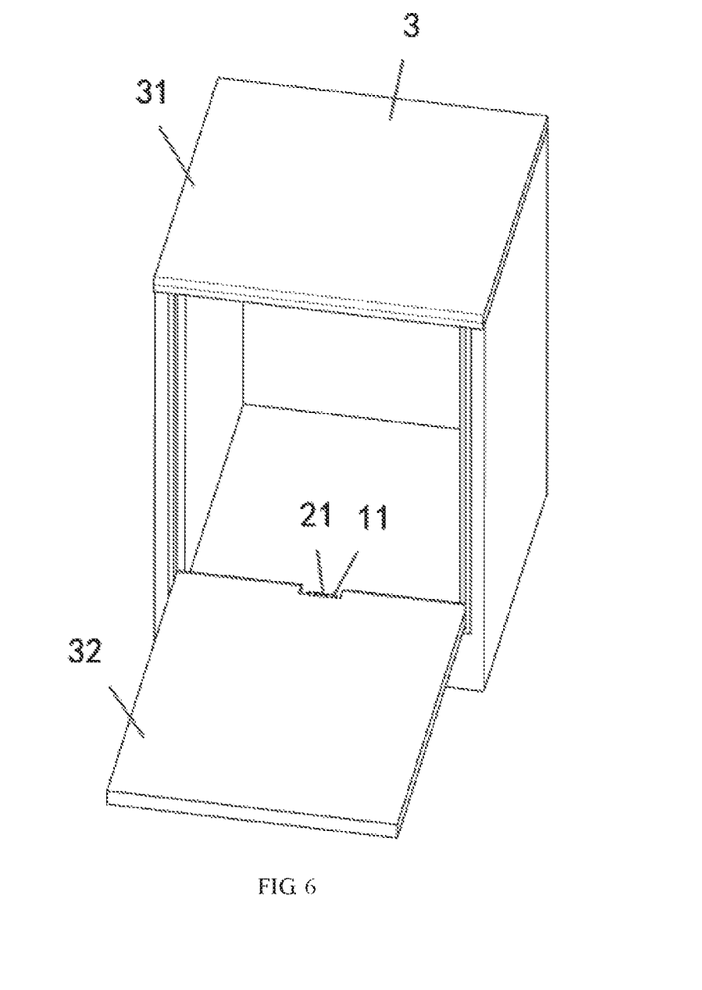
FIG. 6 is a perspective view of a table dishwasher according to an embodiment.
Figure 7:
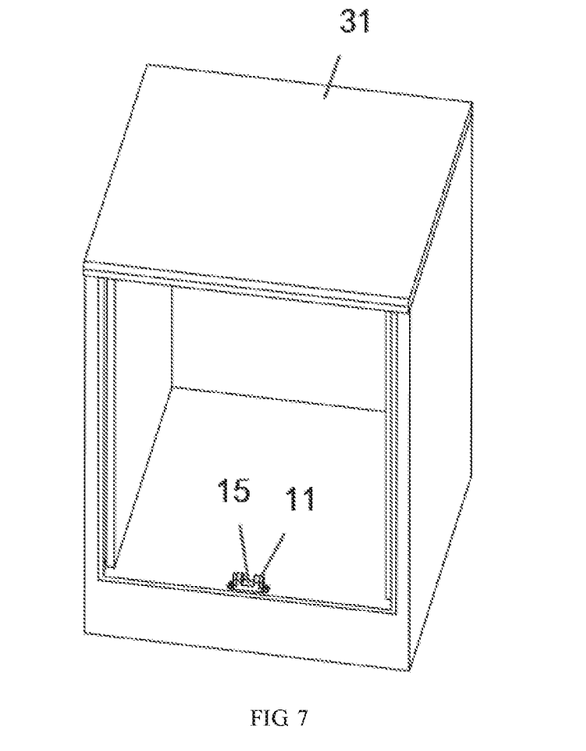
FIG. 7 is a perspective view of a mainframe of the table dishwasher of FIG. 6.
Figure 8:
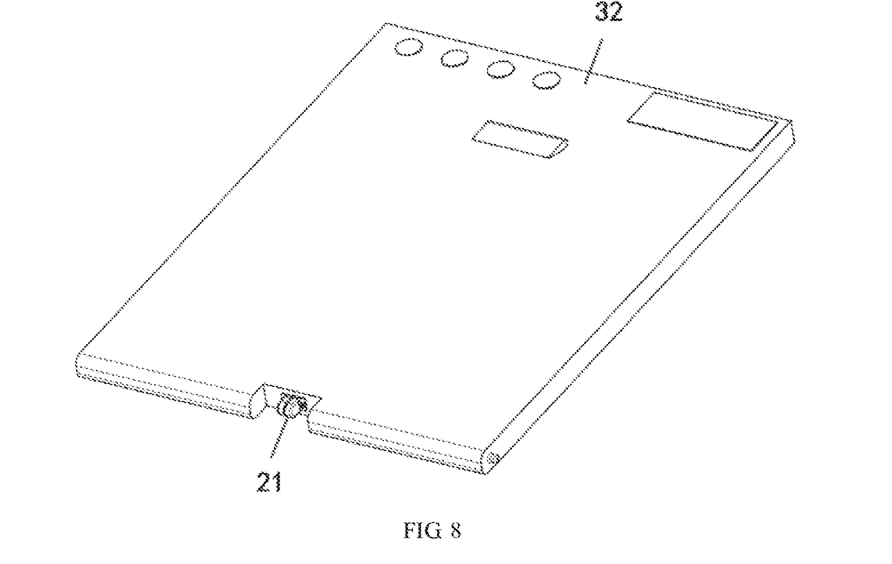
FIG. 8 is a perspective view of a cover of the table dishwasher of FIG. 6.

In the embodiment shown in FIGS. 6-8, the electrical apparatus 3 is a table dishwasher, the first housing 11 is mounted on the mainframe 31 of the table dishwasher, and the second housing 21 is mounted on the cover 32 of the table dishwasher. The first housing 11 and the second housing 21 are both mounted at positions close to the rotation axis of the cover 32. The first housing 11 and the second housing 21 are respectively fixed on the mainframe 31 and the cover 32 of the table dishwasher by screws, snap-fit, adhesives and the like. The cable of the transmitting coil assembly 1 in the first housing 11 is connected to the main control system of the table dishwasher, and the cable of the receiving coil assembly 2 in the second housing 21 is connected to the electric appliance of the table dishwasher such as a display screen and an operation switch or a button. The axes of the first magnetic core 12 in the first housing 11 and the second magnetic core 22 in the second housing 21 are respectively coincident with the rotation axis of the cover 32 of the table dishwasher, and the receiving coil assembly 2 in the second housing 21 is always accommodated in the recess 15 of the first housing 11. During the opening or closing of the cover 32 of the table dishwasher, the first housing 11 and the transmitting coil assembly 1 received therein are kept stationary, the second housing 21 and the receiving coil assembly 2 received therein are rotated about the rotation axis of the cover 32, the receiving coil assembly 2 in the second housing 21 is always accommodated in the recess 15 of the first housing 11 during the entire opening or closing, and the internal current is wirelessly transmitted from the transmitting coil assembly 1 to the receiving coil assembly 2, thereby supplying the current to the electric appliance on the cover 32 of the table dishwasher.

Figure 9:
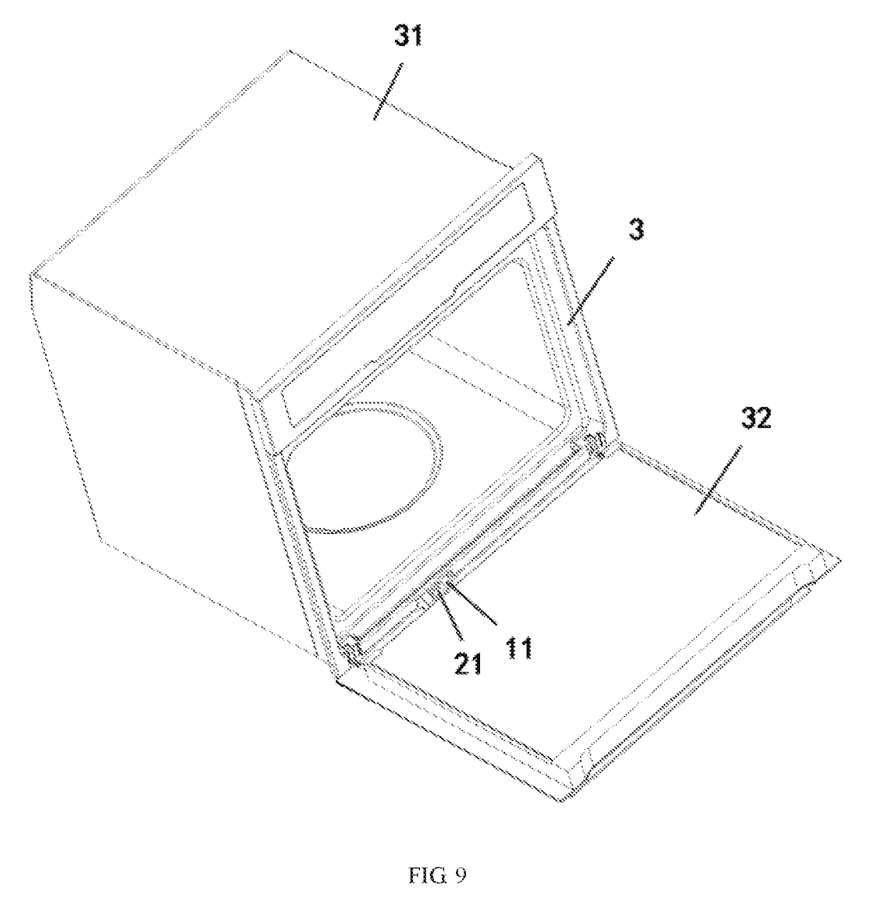
FIG. 9 is a perspective view of a microwave oven according to an embodiment.
Figure 10:
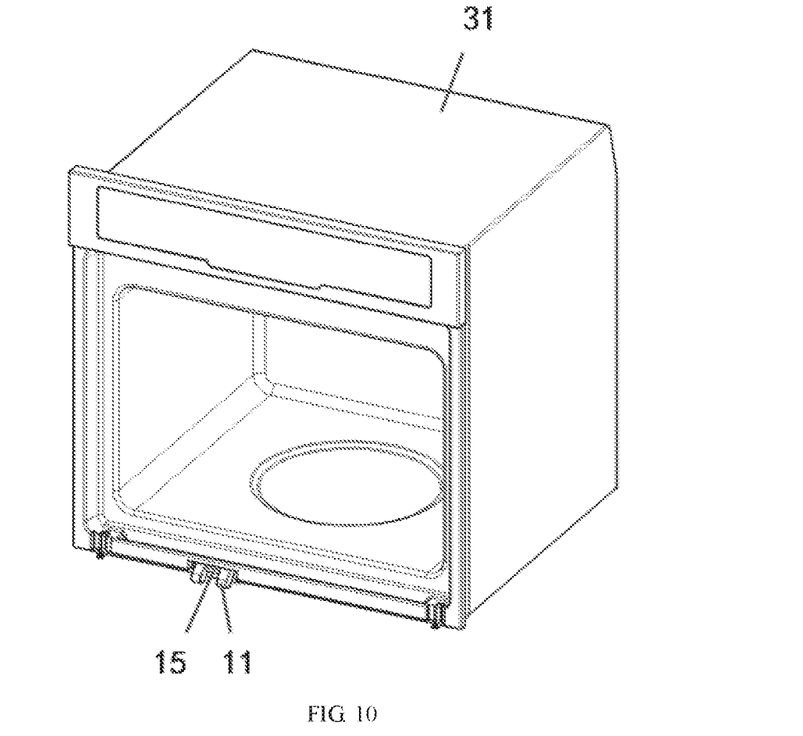
FIG. 10 is a perspective view of a mainframe of the microwave oven of FIG. 9.
Figure 11:
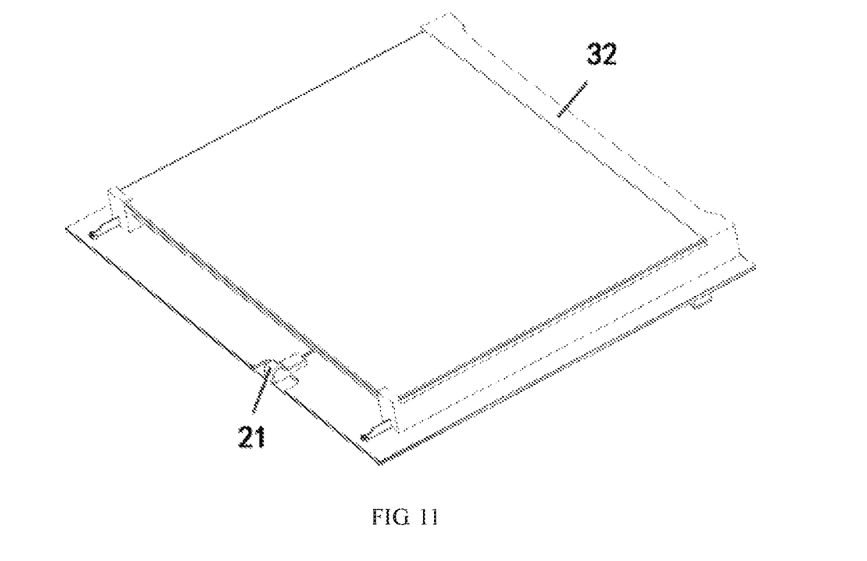
FIG. 11 is a perspective view of a cover of the microwave oven of FIG. 9.

In the embodiment shown in FIGS. 9-11, the electric apparatus 3 is a microwave oven, the first housing 11 is mounted on the mainframe 31 of the microwave oven, and the second housing 21 is mounted on the cover 32 of the microwave oven. The first housing 11 and the second housing 21 are mounted at positions close to the rotation axis of the cover 32. The first housing 11 and the second housing 21 are respectively fixed on the mainframe 31 and the cover 32 of the microwave oven by screws, snap-fit, adhesives and the like. The cable of the transmitting coil assembly 1 in the first housing 11 is connected to the main control system of the microwave oven, and the cable of the receiving coil assembly 2 in the second housing 21 is connected to electric appliance of the microwave oven such as a display screen, an operating switch or a button. The axes of the first magnetic core 12 in the first housing 11 and the second magnetic core 22 in the second housing 21 are respectively coincident with the rotation axis of the cover 32 of the microwave oven, and the receiving coil assembly 2 in the second housing 21 is always accommodated in the recess 15 of the first housing 11. During the opening or closing of the cover 32 of the microwave oven, the first housing 11 and the transmitting coil assembly 1 received therein are kept stationary, the second housing 21 and the receiving coil assembly 2 received therein are rotated about the rotation axis of the cover 32, the receiving coil assembly 2 in the second housing 21 is always accommodated in the recess 15 of the first housing 11 during the entire opening or closing, and the internal current is wirelessly transmitted from the transmitting coil assembly 1 to the receiving coil assembly 2, thereby supplying the current to the electric appliance on the cover 32 of the microwave oven.

In addition to the above-described embodiments, the electrical apparatus 3 may also be a cabinet dishwasher, an integrated kitchen dishwasher, or any other electrical appliance.

Those skilled in the art will appreciate that the above-described embodiments are illustrative and can be modified by those skilled in the art, and that the structures described in the various embodiments can be freely combined without conflict in structure or principle. Although the present disclosure has been described with reference to the accompanying drawings, the embodiments disclosed in the drawings are intended to be illustrative explanation of embodiments of the present disclosure, and should not be construed as limiting the present disclosure. Although a few embodiments of the present general inventive concept have been shown and described, it would be appreciated by those skilled in the art that changes may be made in these embodiments without departing from the principles and spirit of the present general inventive concept, and the scope of the present disclosure is defined by the claims and their equivalents.

What is claimed is:

1. A wireless power supply device, comprising:
   a first housing having a U-shaped outer contour and including a first portion, a second portion, and a third portion, the second portion and the third portion extending perpendicularly to the first portion from opposite ends of the first portion, the second portion and the third portion forming a recess between the second portion and the third portion, the first portion has a cuboid-shape, and the second portion and the third portion each have an arch-shape;
   a transmitting coil assembly mounted in the first housing;
   a second housing extending into the recess; and
   a receiving coil assembly mounted in the second housing and electromagnetically coupled with the transmitting coil assembly.

2. The wireless power supply device of claim 1, wherein the transmitting coil assembly includes a first magnetic core having a main body portion mounted in the first portion, the second portion, and the third portion of the first housing, a first winding portion mounted in the second portion of the first housing, and a second winding portion mounted in the third portion of the first housing.

3. The wireless power supply device of claim 2, wherein the transmitting coil assembly includes a first transmitting coil winding wound around the first winding portion and a second transmitting coil winding wound around the second winding portion, the first transmitting coil winding and the second transmitting coil winding are electrically connected to each other.

4. The wireless power supply device of claim 1, wherein the receiving coil assembly includes a second magnetic core, a first receiving coil winding, and a second receiving coil winding mounted in the second housing, the first receiving coil winding and the second receiving coil winding are wound around opposite ends of the second magnetic core, and the first receiving coil winding and the second receiving coil winding are electrically connected.

5. The wireless power supply device of claim 3, wherein the main body portion of the first magnetic core is U-shaped and has a plate-shaped bottom portion, a first plate-shaped side portion, and a second plate-shaped side portion, the first plate-shaped side portion and the second plate-shaped side portion disposed at opposite ends of the plate-shaped bottom portion.

6. The wireless power supply device of claim 5, wherein the first plate-shaped side portion and the second plate-shaped side portion are parallel to each other and are both perpendicular to the plate-shaped bottom portion, the first winding portion is disposed at an end of the first plate-shaped side portion distal to the plate-shaped bottom portion and extends perpendicular to the first plate-shaped side portion, and the second winding portion is disposed at an end of the second plate-shaped side portion distal to the plate-shaped bottom portion and extends perpendicular to the second plate-shaped side portion.

7. The wireless power supply device of claim 6, wherein the first winding portion and the second winding portion are both cylindrical and are coaxial, an axis of the first winding portion and the second winding portion is perpendicular to the first plate-shaped side portion and the second plate-shaped side portion.

8. The wireless power supply device of claim 1, wherein the second portion has a first arch portion and a second arch portion, and the third portion has a third arch portion and a fourth arch portion, the first arch portion, the second arch portion, the third arch portion, and the fourth arch portion are sequentially disposed at a same side of the first portion, the first arch portion and the fourth arch portion are symmetrically disposed, and the second arch portion and the third arch portion are symmetrically disposed.

9. The wireless power supply device of claim 8, wherein a height of the second arch portion is greater than a height of the first arch portion, and a height of the third arch portion is greater than a height of the fourth arch portion.

10. The wireless power supply device of claim 8, wherein a length of the first portion is greater than a distance between an end surface of the second portion distal to the third portion and an end surface of the third portion distal to the second portion.

11. The wireless power supply device of claim 1, wherein the second housing has a fourth portion that is a cavity structure with an opening, and a fifth portion that is a plate-shaped structure extending outwards from an edge of the opening, the fourth portion accommodates the second magnetic core, the first receiving coil winding, and the second receiving coil winding, and a length of the fourth portion is less than a length of the recess.

12. The wireless power supply device of claim 11, wherein the fourth portion has a fifth arch portion and a sixth arch portion symmetrically disposed, a connection groove is disposed at a junction of the fifth arch portion and the sixth arch portion.

13. The wireless power supply device of claim 1, wherein the second portion and the third portion are detachably coupled to the first portion to form a substantially enclosed receiving chamber.

14. The wireless power supply device of claim 1, wherein a side of the first portion facing the second portion and the third portion has a mounting hole adapted to mount the second portion and the third portion therein.

15. An electrical apparatus, comprising:
a mainframe;
a cover pivotably mounted on the mainframe; and
a wireless power supply device including:
    a first housing having a U-shaped outer contour and including a first portion, a second portion, and a third portion, the second portion and the third portion extending perpendicularly to the first portion from opposite ends of the first portion, the second portion and the third portion forming a recess between the second portion and the third portion, the first housing mounted on one of the mainframe and the cover;
    a transmitting coil assembly mounted in the first housing;
    a second housing extending into the recess, the second housing mounted on the other of the mainframe and the cover, the first housing and the second housing are mounted at a position close to a rotation axis of the cover; and
    a receiving coil assembly mounted in the second housing and electromagnetically coupled with the transmitting coil assembly.

16. The electrical apparatus of claim 15, wherein the first housing is mounted on the mainframe and the second housing is mounted on the cover.

17. The electrical apparatus of claim 15, wherein the receiving coil assembly is disposed in the recess of the first housing and electromagnetically coupled with the transmitting coil assembly when the cover is rotated to a closed position or an open position relative to the mainframe.

18. The electrical apparatus of claim 15, wherein the electrical apparatus is one of a sink dishwasher, a table dishwasher, a cabinet dishwasher, an integrated kitchen dishwasher, or a microwave oven.

19. A wireless power supply device, comprising:
a first housing having a U-shaped outer contour and including a first portion, a second portion, and a third portion, the second portion and the third portion extending perpendicularly to the first portion from opposite ends of the first portion, the second portion and the third portion forming a recess between the second portion and the third portion;
a transmitting coil assembly mounted in the first housing;
a second housing extending into the recess, the second housing has a fourth portion that is a cavity structure with an opening, and a fifth portion that is a plate-shaped structure extending outwards from an edge of the opening, a length of the fourth portion is less than a length of the recess; and
a receiving coil assembly mounted in the second housing and electromagnetically coupled with the transmitting coil assembly.

20. The wireless power supply device of claim 19, wherein the fourth portion has a fifth arch portion and a sixth arch portion symmetrically disposed, a connection groove is disposed at a junction of the fifth arch portion and the sixth arch portion.

21. A wireless power supply device, comprising:
- a first housing having a U-shaped outer contour and including a first portion, a second portion, and a third portion, the second portion and the third portion extending perpendicularly to the first portion from opposite ends of the first portion, the second portion and the third portion forming a recess between the second portion and the third portion, the second portion and the third portion are detachably coupled to the first portion to form a substantially enclosed receiving chamber;
- a transmitting coil assembly mounted in the first housing;
- a second housing extending into the recess; and
- a receiving coil assembly mounted in the second housing and electromagnetically coupled with the transmitting coil assembly.

22. A wireless power supply device, comprising:
- a first housing having a U-shaped outer contour and including a first portion, a second portion, and a third portion, the second portion and the third portion extending perpendicularly to the first portion from opposite ends of the first portion, the second portion and the third portion forming a recess between the second portion and the third portion, a side of the first portion facing the second portion and the third portion has a mounting hole adapted to mount the second portion and the third portion therein;
- a transmitting coil assembly mounted in the first housing;
- a second housing extending into the recess; and
- a receiving coil assembly mounted in the second housing and electromagnetically coupled with the transmitting coil assembly.

* * * * *